United States Patent [19]

Handy

[11] 4,397,358

[45] Aug. 9, 1983

[54] FLOATING ROD WEEDER

[76] Inventor: Barry L. Handy, Box N-53, Star Rte. 285, Scobey, Mont. 59263

[21] Appl. No.: 285,603

[22] Filed: Jul. 21, 1981

[51] Int. Cl.³ .............................................. A01B 39/19
[52] U.S. Cl. ....................................... 172/44; 172/125
[58] Field of Search ........................... 172/44, 624, 125

[56] References Cited

U.S. PATENT DOCUMENTS

| | | | |
|---|---|---|---|
| 1,974,869 | 9/1934 | Hotto | 172/624 |
| 2,157,702 | 5/1939 | Hoke | 172/624 |
| 3,033,294 | 5/1962 | Edwards | 172/44 |
| 3,108,642 | 10/1963 | Hunter | 172/44 |
| 3,186,494 | 6/1965 | Jackson | 172/44 |
| 3,443,645 | 5/1969 | Edwards | 172/44 |
| 3,576,213 | 4/1971 | Hall | 172/44 |
| 3,651,870 | 3/1972 | Calkins | 172/44 |
| 3,768,425 | 10/1973 | Seifert, Jr. | 172/44 X |
| 4,171,723 | 10/1979 | Hood et al. | 172/44 X |

Primary Examiner—Paul E. Shapiro
Attorney, Agent, or Firm—Harvey B. Jacobson

[57] ABSTRACT

An upstanding housing is provided having upper and lower ends and first support structure supports the upper and lower ends of the housing from a first depending tool shank of one gang section of a cultivator assembly for limited vertical shifting of the housing relative to the first tool shank. Powered output shaft structure is journaled from the lower end of the housing for rotation about a horizontal axis extending transversely of the gang section and a rod weeder shaft has one end supported from and driven by the powered output shaft. Journal structure is mounted on the rod weeder shaft at a point spaced therealong from the powered output shaft and second support means supports the journal structure from a second tool shank of the cultivator gang section for limited vertical shifting relative thereto. The floating action of the rod weeder shaft relative to the cultivator tool shank enables the rod weeder to be operated at substantially constant depth, independent of the working depth of the associated cultivator shank.

5 Claims, 7 Drawing Figures

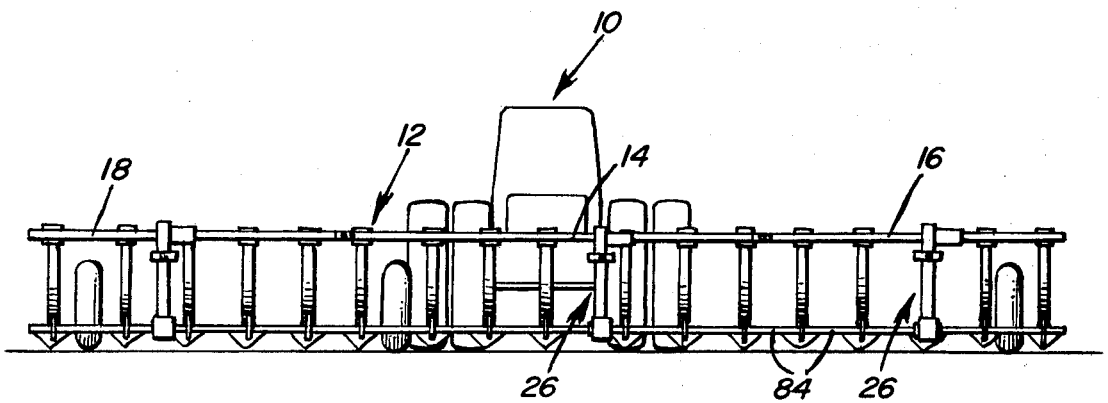
FIG. 1
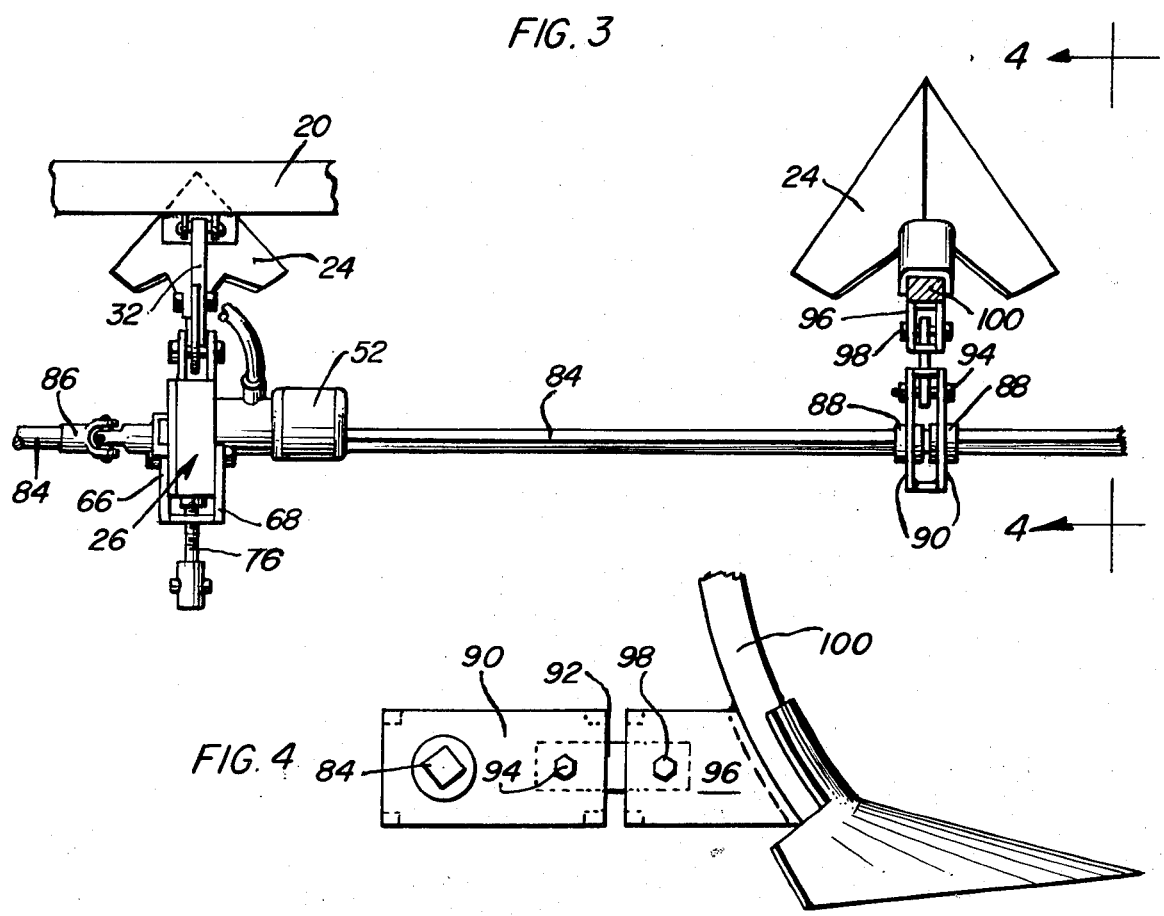
FIG. 3
FIG. 4

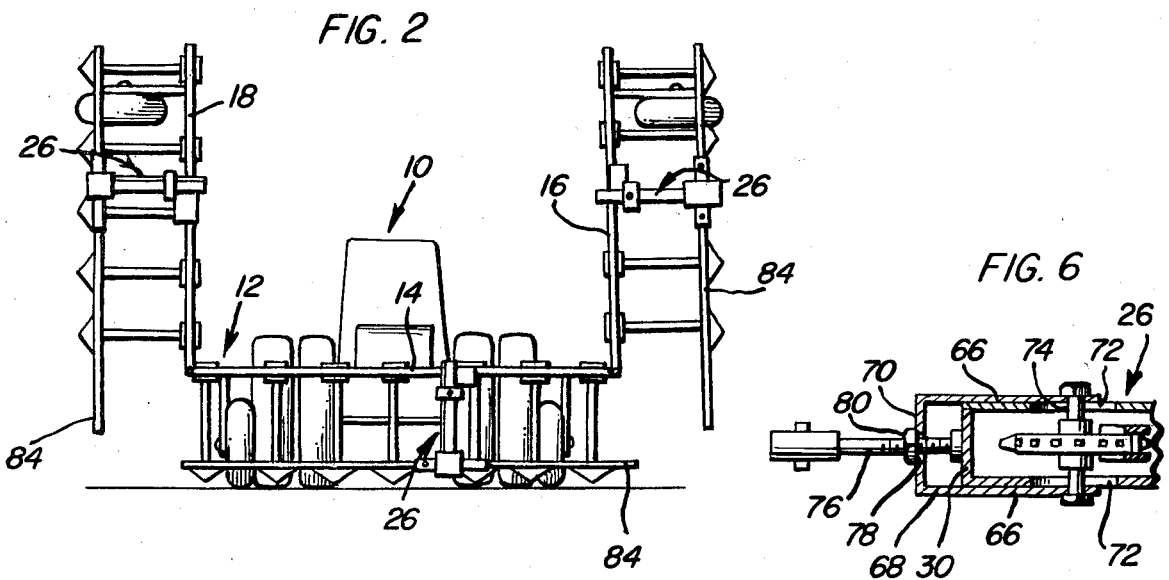
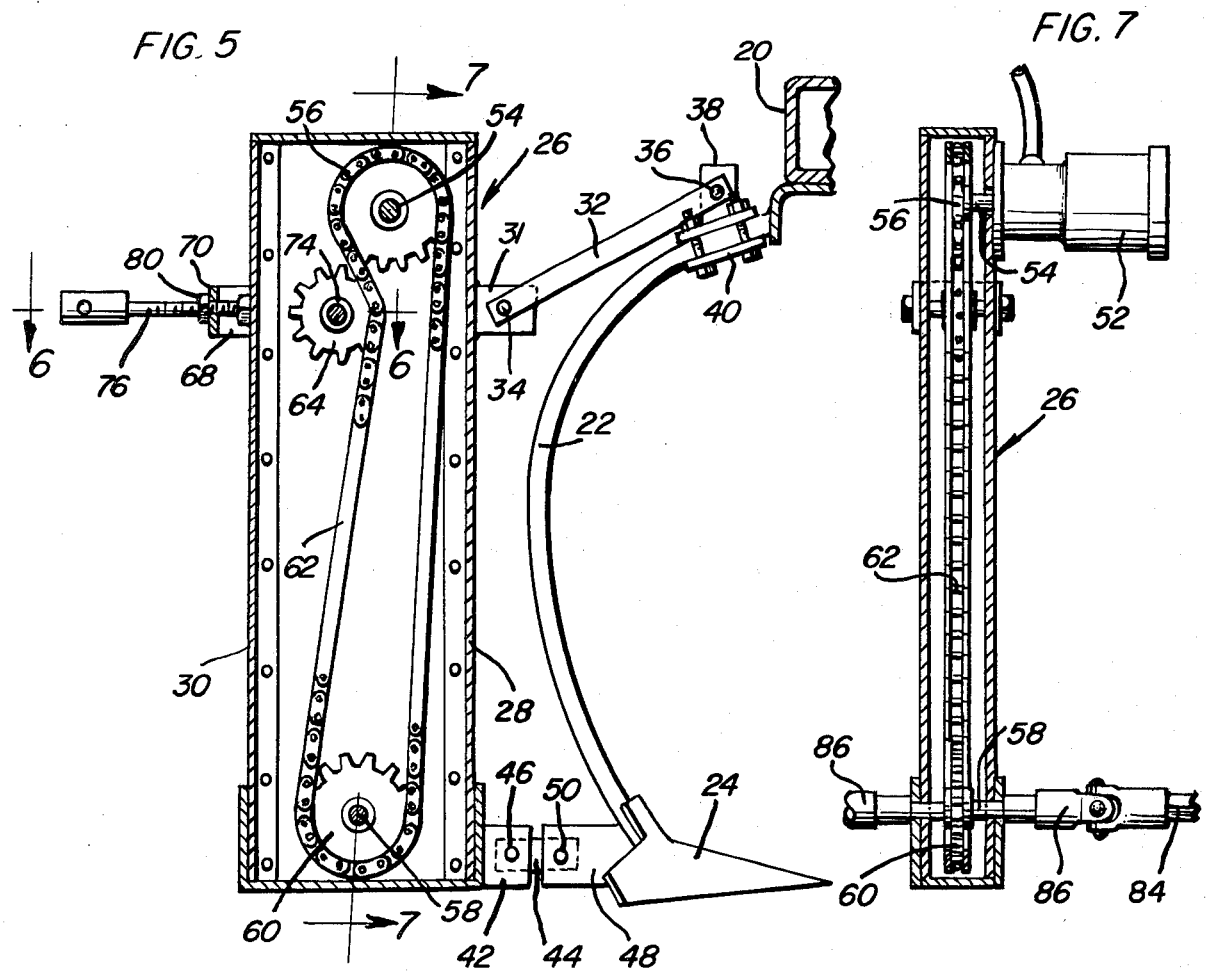

FLOATING ROD WEEDER

BACKGROUND OF THE INVENTION

Various forms of rod weeder attachments heretofore have been provided for use in conjunction with cultivator assemblies. However, most of these previously known forms of rod weeders include extensive drive trains, or are not functional to automatically seek, generally, a predetermined operating depth independent of the operating depth of the associated tool shanks and further are not readily adaptable to multi-section gang cultivators due to the extensive drive trains used in conjunction therewith. Accordingly, a need exists for an improved form of rod weeder, rod weeder drive and rod weeder mounting structure.

Examples of previously known forms of rod weeders are disclosed in U.S. Pat. Nos. 2,596,270, 2,767,631, 2,886,113, 3,108,642, 3,186,494, 3,283,830, 3,360,053, 3,735,816, 3,768,425 and 4,171,723.

BRIEF DESCRIPTION OF THE INVENTION

The rod weeder of the instant invention utilizes a hydraulic drive for each section of a multi-section cultivator assembly with which the rod weeder is functional and the hydraulic drive includes a hydraulic motor for each rod weeder section with multiple rod weeder sections being driven by a corresponding number of hydraulic motors connected together in series. In this manner, constant speed of operation of all of the rod weeders is maintained and multi-sections of a multi-section cultivator assembly equipped with the rod weeder of the instant invention may be folded relative to each other without disconnecting universal joints and the like normally utilized to connect adjacent rod weeder sections.

Still further, the rod weeder of the instant invention enjoys a unique mounting assembly whereby each rod weeder section is automatically operative, generally, at a predetermined depth independent of the working depth of the associated tool shanks.

The main object of this invention is to provide an improved form of rod weeder which may be utilized on multi-section gang-type cultivator assemblies in a manner such that the rod weeder of each section is rotated at substantially the same speed as the rod weeders of the other sections.

Yet another object of this invention is to provide an improved rod weeder on multiple sections of a multi-section gang-type cultivator assembly and with the rod weeders of such construction to enable ready relative swinging (folding) of adjacent cultivator sections.

Another very important object of this invention is to provide a rod weeder for use in conjunction with a multi-section cultivator assembly and with the various sections of the rod weeder being operable to function, generally, at a given depth independent of the working depth of the associated tool shanks of the cultivator.

A further object of this invention is to provide a rod weeder including structural features thereof which enable the rod weeder to be readily removably mounted upon an associated cultivator assembly.

A final object of this invention to be specifically enumerated herein is to provide a rod weeder in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a rear elevational view of a multi-section, gang-type cultivator assembly operatively connected to a farm tractor and incorporating the rod weeder of the instant invention;

FIG. 2 is a rear elevational view similar to FIG. 1, but with the sections of the cultivator assembly relatively folded;

FIG. 3 is a fragmentary enlarged top plan view of the rod weeder;

FIG. 4 is a fragmentary enlarged vertical sectional view taken substantially upon the plane indicated by the section line 4—4 of FIG. 3;

FIG. 5 is an enlarged fragmentary vertical sectional view taken substantially upon the plane passing centrally through one of the drive units of the rod weeder;

FIG. 6 is a fragmentary horizontal sectional view of the drive unit taken substantially upon the plane indicated by the section line 6—6 of FIG. 5; and FIG. 7 is a transverse vertical sectional view taken substantially upon the plane indicated by the section line 7—7 of FIG. 5.

DETAILED DESCRIPTION OF THE INVENTION

Referring now more specifically to the drawings, the numeral 10 generally designates a conventional form of tractor behind which a conventional multi-section, gang-type cultivator assembly referred to by the reference numeral 12 is operatively connected. The cultivator assembly 12 includes a center section 14 and a pair of opposite side wing sections 16 and 18 which may be swung between the extended positions thereof illustrated in FIG. 1 and the folded positions thereof illustrated in FIG. 2.

Each of the sections 14, 16 and 18 includes a tool bar 20 from which a plurality of spring shanks or tines 22 are dependingly supported, the lower ends of the spring shanks or tines 22 having shovel sweeps 24 removably mounted thereon.

The rod weeder of the instant invention is used in multiples thereof on the cultivator assembly 12 with a rod weeder supported from each cultivator assembly. Each section of the cultivator assembly 12 includes a closed upstanding drive housing referred to in general by the reference numeral 26 including front and rear sides 28 and 30. The upper portion of the front side 28 includes a forwardly projecting apertured mounting lug 31 to which the rear end of a suspension link 32 is pivotally anchored as at 34. The forward end of the suspension link 32 is pivotally anchored as at 36 to an upstanding mounting lug 38 supported from a clamp assembly 40 mounted upon the upper end of a selected spring shank or tine 22.

The lower portion of the front side 28 of the drive housing 26 includes a pair of laterally spaced forwardly projecting mounting lugs 42 between which the rear end of a short link 44 is pivotally mounted as at 46. The shovel sweep 24 includes a pair of rearwardly projecting mounting lugs 48 between which the forward end of the link 44 is pivotally mounted as at 50. The opposing forward and rear edges of the mounting lugs 42 and 48 are spaced slightly apart and are abuttingly engageable with each other upon upward and downward swinging of the drive housing 26 relative to the shovel sweep 24 in order to limit upward and downward movement of the housing 26 relative to the spring shank or tine 22.

The upper portion of the drive housing 26 has a hydraulic motor 52 mounted thereon and the drive motor 52 includes an output shaft 54 which projects into the housing 26 and has a sprocket wheel 56 mounted thereon. In addition, the lower end of the housing 26 rotatably journals a horizontal transverse output shaft 58 and the portion of the output shaft 58 disposed within the housing 26 has a sprocket wheel 60 mounted thereon. An elongated endless chain 62 is trained about the sprocket wheels 56 and 60 and thus drivingly connects the sprocket wheel 56 to the sprocket wheel 60.

In addition, an idler sprocket 64 is journaled between forwardly directed furcations 66 of a bifurcated mount 68 having its bight portion 70 spaced rearwardly of the rear side 30 of the housing 26. The opposite side walls of the housing 26 include horizontal front-to-rear extending slots 72 through which the ends of the idler shaft 74 upon which the idler sprocket 64 is mounted are slidingly received. The rear side 30 of the housing 26 supports the forward end of a horizontally rearwardly projecting threaded shank 76 and the threaded shank 76 is slidably received through a bore 78 provided therefor in the bight portion 70 of the bracket or mount 68. An abutment nut 80 is threaded on the shank 76 and abuts the rear side of the bight portion 70. Accordingly, the nut 80 may be threadingly advanced toward the rear side 30 of the housing 26 in order to forwardly displace the idler sprocket 64 and thereby tighten the chain 62 which is trained over the sprocket 64, see FIG. 5.

The rod weeder further includes a square rod weeder shaft 84 to one end of which the output shaft 58 is drivingly connected by a universal joint 86. Of course, the end of the rod weeder shaft 84 adjacent the output shaft 58 is supported relative to the latter by the universal joint 86.

The end portion of the rod weeder shaft 84 remote from the output shaft 58 includes a plurality of bearings 88 thereon and each pair of bearings 88 is carried by the rear ends of a pair of laterally spaced and interconnected plates 90 which extend in front-to-rear directions. The rear end of a short connecting link 92 similar to the connecting link 44 is pivotally anchored between the front ends of the plates 90 as at 94 and the front end of the connecting link 92 is pivotally connected between a pair of rearwardly directed mounting lugs 96 as at 98. The mounting lugs 96 are carried by and project rearwardly from a spring shank or tine 100 adjacent and spaced from the tine 22.

The housing 26 may be centrally disposed on each of the sections 14, 16 and 18 and each opposite end of the power output shaft 58 may have a universal joint 86 mounted thereon for connection with an adjacent rod weeder shaft 84. Accordingly, only one motor 52 is used to drive a plurality of rod weeder shafts supported from each of the sections 14, 16 and 18.

The hydraulic motors 52 are connected in series in a hydraulic circuit (not shown) to which hydraulic fluid under pressure is supplied from the hydraulic system (not shown) of the tractor 10. In this manner, all of the rod weeder shafts 84 rotate at substantially the same speed. Further, inasmuch as the housing 26 and each pair of bearings 88 are supported from the corresponding tool shanks 22 and 100 for limited vertical swinging between upper and lower limit positions, it may be seen that the rod weeder shafts 84 may seek their own level, independent of the working level of the associated spring shank or tine 22. If the spring shanks or tines 22 are working at a greater depth, the lower ends thereof are more vertically disposed and, thus, the housing 26 and bearings 88 may be elevated more greatly relative to the associated winged sweeps 24. In this manner, the rod weeder shafts 84 tend to seek, generally, the same working level independent of the working level of the associated spring shanks or tines 22.

It will noted from FIG. 2 of the drawings that in the event it is necessary to fold the sections 16 and 18 relative to the section 14, the folding operation may be readily carried out without regard to the presence of the rod weeder. Inasmuch as each of the sections 14, 16 and 18 includes its own hydraulic drive motors 52 for the associated rod weeder shafts, there is no need to utilize universal joints between the rod weeder shafts of adjacent cultivator sections. Further, means other than the chain 62 may be used to drivingly connect the shaft 54 to the shaft 58.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an implement including at least one gang section having a plurality of laterally spaced tool shanks dependingly supported therefrom, a floating rod weeder assembly including an upstanding housing having upper and lower ends, first support means supporting said upper and lower ends of said housing behind a first of said tool shanks for limited vertical shifting relative to said first shank, powered output shaft means journaled from the lower end of said housing for rotation about a horizontal axis extending transversly of said gang section, a rod weeder shaft having one end supported from and driven by said powered output shaft, and a plurality of journal means mounted on said rod weeder shaft and spaced apart axially therealong and from said powered output shaft, a plurality of second support means supporting said journal means rearwardly of and from a corresponding tool shank of the other tool shanks for limited vertical shifting relative to said second shank, said first support means including a forwardly projecting first mounting portion stationarily supported from the lower end of said housing and a rearwardly projecting second mounting portion stationarily supported from the lower end of said first shank, said second support means including third stationary mounting portions projecting forwardly from said journal means and fourth stationary mounting portions projecting rearwardly from the lower ends of said other tool shanks, said first and second support means further including elongated horizontal first and second links, respectively, extending between and pivotally anchored at their opposite ends to said first and second mounting portions and said third and fourth mounting portions, respectively, for angular displacement relative thereto about horizontal transverse axes, said first and second mounting portions and said third and fourth mounting portions including coacting portions engageable with each other to limit up and down vertical shifting of said first and third mounting portions and said second and fourth mounting portions relative to each other.

2. The cultivator assembly of claim 1, wherein said upper end of said housing supports a power input shaft and a hydraulic motor drivingly connected to said power input shaft, said power input shaft and said powered output shaft including portions thereof disposed within said housing, drive and driven wheels carried by said power input shaft and powered output shaft, and elongated endless flexible drive means trained about said drive and driven wheels.

3. The cultivator assembly of claim 2, including an idler wheel journaled in said housing and adjustably shiftable laterally of a plane containing said power input shaft and said powered output shaft, one reach of said endless flexible drive means extending between said power input shaft and powered output shaft being passed about said idler wheel and deflected thereby.

4. The cultivator assembly of claim 1, wherein said assembly includes a plurality of gang sections, each of said sections including a plurality of cultivator tool shanks dependingly supported therefrom, each plurality of tool shanks having an upstanding housing supported therefrom behind a first tool shank of each set of shanks and each set of shanks including a second shank having journal means supported therefrom axially spaced from the associated housing, each of said housings including a power input shaft and a powered output shaft and each of said sets of shanks including a rod weeder shaft supported from the corresponding powered output shaft and associated journal means and driven by the corresponding powered output shaft, each of said housings supporting a fluid motor therefrom drivingly connected to the corresponding power input shaft, said fluid motors being connected in series within a hydraulic circuit.

5. The cultivator assembly of claim 4, wherein said gang sections are mounted from each other for relative angular displacement about generally horizontal front-to-rear extending axes.

* * * * *